US007759434B2

(12) United States Patent
Funk et al.

(10) Patent No.: US 7,759,434 B2
(45) Date of Patent: Jul. 20, 2010

(54) IONICALLY AND/OR ORGANOMETALLICALLY FUNCTIONALIZED SILICONE POLYMERS CROSSLINKABLE TO HIGH-STRENGTH ELASTOMERS

(75) Inventors: Enno Funk, Mehring (DE); Frank Achenbach, Simbach (DE)

(73) Assignee: Wacker Chemie AG, Munich (DE)

( * ) Notice: Subject to any disclaimer, the term of this patent is extended or adjusted under 35 U.S.C. 154(b) by 76 days.

(21) Appl. No.: 12/095,236

(22) PCT Filed: Nov. 27, 2006

(86) PCT No.: PCT/EP2006/068941

§ 371 (c)(1),
(2), (4) Date: May 28, 2008

(87) PCT Pub. No.: WO2007/063046

PCT Pub. Date: Jun. 7, 2007

(65) Prior Publication Data
US 2008/0293878 A1 Nov. 27, 2008

(30) Foreign Application Priority Data
Dec. 1, 2005 (DE) .................. 10 2005 057 460

(51) Int. Cl.
C08F 283/12 (2006.01)
(52) U.S. Cl. .................. 525/474; 525/477; 528/10; 528/32; 528/41
(58) Field of Classification Search .................. 524/588; 525/474; 526/279
See application file for complete search history.

(56) References Cited

U.S. PATENT DOCUMENTS

| 3,047,528 | A | | 7/1962 | Bluestein |
| 3,248,409 | A | | 4/1966 | Bluestein |
| 3,326,952 | A | | 6/1967 | Wilkus et al. |
| 4,495,340 | A | | 1/1985 | Blizzard et al. |
| 5,952,443 | A | * | 9/1999 | Wilt et al. ............... 528/26 |
| 6,124,491 | A | | 9/2000 | Wolter et al. |
| 6,783,709 | B2 | | 8/2004 | Harreld et al. |

FOREIGN PATENT DOCUMENTS

| CA | 2 274 040 A1 | 11/2000 |
| CA | 2 309 486 A1 | 11/2000 |
| DE | 1 495 970 | 5/1969 |
| EP | 1 264 865 A1 | 12/2002 |

OTHER PUBLICATIONS

Nikitana et al., "Deformation of Poly(dimethylsiloxane) Oligomers Under Uniaxial Tension: Quantum Chemical View," J. Phys. Chem. A, v. 103, pp. 11355-11365.
Kirk-Othmer, "Ionomers," Encyclopedia of Chemical Technology, 4th ed., v. 14., pp. 815-829 (1995).
Gornowicz et al., "Synthesis and Properties of Carboxylate Siloxane Ionomers," Polymeric Materials Science and Eng., v. 59, pp. 1009-1013 (1988).
Klok et al., "Reversible Gelation of Poly(dimethylsiloxane) with Ionic and Hydrogen-Bonding Substituents," Journal of Polymer Sci., Part B: Polymer Physics, v. 37, pp. 485-495 (1999).
Zhang et al., "Synthesis and Characterization of Liquid Crystalline Ionomers with Polymethylhydrosiloxane Main-Chain- and Side-Chain-Containing Sulfonic Acid Groups," J. of Applied Polymer Sci., v. 68, pp. 1555-1561 (1998).
Huang et al., "Ion Aggregation in the Polysiloxane Ionomers Bearing Pendant Quaternary Ammonium Groups," J. of Applied Polymer Sci., v. 83, pp. 3099-3104 (2002).
Hu et al., "Synthesis and Characterization of Chiral Smectic Side-Chain Liquid Crystalline Polysiloxanes and Ionomers Containing Sulfonic Acid Groups," J. Applied Polymer Sci., v. 80, pp. 2335-2340 (2001).
Graiver et al., "Polysiloxane Zwitterionomers and Related Model Compounds, I. Synthesis," J. of Polymer Sci.: Polymer Chemistry Edition, v. 17, pp. 3559-3572 (1979).
Yu et al., "Poly(chloropropylmethyl-dimethylsiloxane)-Polyurethane Elastomers, Synthesis and Properties of Segmented Copolymers and Related Zwitterionomers," J. of Polymer Sci: Part B: Polymer Physics, v. 24, pp. 2681-2702 (1986).
Lupton, E.M., "Stretching Siloxanes: An ab initio molecular dynamics study," Chemical Physics Letters 414 (2005), pp. 132-137.

\* cited by examiner

*Primary Examiner*—Randy Gulakowski
*Assistant Examiner*—Kyle Baumstein
(74) *Attorney, Agent, or Firm*—Brooks Kushman P.C.

(57) ABSTRACT

High strength silicone elastomers with enhanced physical properties are prepared from silicone polymers having ionic or organometallic functional groups, crosslinked through coulombic interactions and/or covalent bonds.

7 Claims, No Drawings

IONICALLY AND/OR ORGANOMETALLICALLY FUNCTIONALIZED SILICONE POLYMERS CROSSLINKABLE TO HIGH-STRENGTH ELASTOMERS

CROSS-REFERENCE TO RELATED APPLICATION

This application is the U.S. national phase of PCT Appln. No. PCT/EP2006/068941 filed Nov. 27, 2006 which claims priority to German application DE 10 2005 057 460.2 filed Dec. 1, 2005.

BACKGROUND OF THE INVENTION

1. Field of the Invention

The invention relates to silicone polymers having ionic and/or organometallic functional groups, which can be crosslinked via coulombic interactions and possibly also via covalent bonds to form high-strength elastomers.

2. Description of the Related Art

The extraordinary importance of silicones as elastomeric materials is based both on their high thermal stability and their extreme low-temperature flexibility. Furthermore, they have excellent UV light stability and oxidation resistance. Silicones also have a unique combination of many other properties, for example a low dielectric constant, good leakage current resistance and dielectric breakdown resistance, hydrophobicity, optical transparency and biocompatibility. The Shore hardness of silicone elastomers can be set over a wide range.

Silicone elastomers are therefore used in numerous industrial sectors in a variety of applications. In automobile construction, they are used, for example, as vibration and resonance dampers, exhaust and catalyst suspensions and also, for example, as engine bearers. Further applications are peristaltic pump tubing in the medical sector, membranes, valves, seals and also, for example, insulators and cable end seals in the high-voltage sector.

However, in terms of their mechanical properties such as the tensile strength, tear propagation resistance and abrasion resistance, silicone elastomers are inferior to other organic elastomers. For this reason, only silicone elastomers which have been reinforced with fillers, in particular finely divided silica, come into consideration for industrial applications. Even then, the abovementioned strengths are comparatively low.

One possible way of improving the mechanical strength of a polymeric material is generally to introduce ionic groups, as is described, for example, in Kirk-Othmer, Encyclopedia of Chemical Technology, 4th ed., Vol. 14, pp. 815-829 (1995).

Silicone elastomers formed by crosslinking of ionic and/or organometallic polymers have hitherto not become widely known. In such silicone elastomers, it is possible for not only ionic and/or organometallic bonds but also covalent bonds to be present, as is the case, for example, for classical ionomers. Furthermore, silicone polymers which contain ionic or organometallic functions but are not crosslinked to form high-strength elastomers are known.

In U.S. Pat. No. 6,783,709, self-healing organosiloxanes which contain reversible and energy-dissipative crosslinking domains are described. In this case, linear polydimethylsiloxanes having lateral oligoglycine groups are prepared. The gel-like masses obtained have self-healing properties. For the present purposes, self-healing is a growing together of cut surfaces which have been brought into contact again after cutting of the gel. The crosslinking points which are responsible for this and are formed by noncovalent interaction have a bond strength of at least 50 and not more than about 1000 pN, which characterizes these as nonspecific interactions (London, Keesom and Debye forces) and hydrogen bonds. The further ionomers disclosed as crosslinker components are not specified in chemical terms. It is therefore not possible to see whether they are organic or silicone isonomers. The structure of these ionomers is said to be noncritical. Rather, these can vary in terms of their chemical composition, charge density and size as long as the silicone compositions claimed each contain ionomers having opposite charges. Compositions which may contain covalent crosslinking points are described, but not any covalently crosslinkable silicone compositions. The mechanical properties of these ionomers or products obtained therefrom are not described further.

The patent documents CA 2,209,486 and CA 2,274,040 describe silicones which have a hydrophobic polysiloxane backbone and at least one hydrophilic group which is covalently bound to the hydrophobic polysiloxane backbone. Hydrophilic groups are chelating ligands having at least two carboxyl functions. Representatives of this class of compounds are based on substituted malonic acid and N-substituted iminodiacetic acid and also, for example, many structural variants of the latter compound or EDTA analogues in general. These silicones having chelating functionality are used as metal-binding or metal ion-binding or surface-active substances. The silicones described are not covalently crosslinkable silicone compositions.

The preparation and properties of carboxylate-functional siloxane ionomers is described in G. A. Gornowitz et al., POLYM. MATER. SCI. ENG. 59, 1009-1013 (1988). These are polysiloxanes having carboxyl functions in the side chain and the corresponding salts of ions of the metals lithium, zinc, titanium, lead and calcium. It can be seen here that although the polysiloxane-containing ionomers have higher ultimate tensile strengths than the corresponding functional polymers containing pure carboxylate groups, i.e. without metal counterions, they at the same time have very low elongations at break, i.e. are very brittle materials which have only very limited usefulness as elastomers.

Curable elastomer compositions are described for the first time in the patent U.S. Pat. No. 3,047,528. These compositions comprise polysiloxane containing carboxyalkyl groups, a filler, for example silica, and polyvalent metal compounds as curing agents. Crosslinking to form an elastomer occurs exclusively via crosslinking points resulting from coulombic interactions between the metal and carboxylate ions. However, the mechanical strengths achieved are far below the values of silicone elastomers customary today. In addition, U.S. Pat. No. 3,248,409 discloses polyvalent metal salts of carboxyalkyl-functional polysiloxanes which are used for making textiles water-repellant.

Polydimethylsiloxanes having lateral carboxyl groups, and also the corresponding zinc ionomers are described by Klok et al., J. POLYM. SCI., PART B, POLYM. PHYSICS 37, 485-495 (1999). Here, the reversible gelling of polydimethylsiloxanes having ionic substituents and substituents which form hydrogen bonds is described.

Examples of liquid-crystalline polysiloxanes and ionomers having sulfonic acid groups in the side chain are disclosed in B. Zhang et al., J. APPL. POLYM. SCI. 68, 1555-1561, and in J. Hu et al., J. APPL. POLYM. SCI. 80, 2335-2340 (2001). Here, the influence of ion aggregation on the mesomorphic properties and the thermal properties of the liquid-crystalline polymers obtained are examined. The mechanical properties are not described.

European published specification EP 1 264 865 A1 claims silicone compositions having improved adhesion and cured silicone products produced therefrom. The compositions are addition-crosslinkable silicone rubbers which contain vulcanizable titanium or zirconium complexes of beta-ketocarbonyl compounds as adhesion promoters. The latter can optionally contain siloxane radicals having an average degree of polymerization of from 0 to 20.

Among the organometallic compounds, metallocenes, in particular ferrocene, are of particular importance. German published specification DE 14 95 970 A1 describes a polysiloxane containing metallocene groups. An HTV vulcanizate which contains such a ferrocene-siloxane copolymer as heat stabilizer is also described.

Z. Huang et al., J. APPL. POLYM. SCI. 83, 3099-3104 (2002) describe the ionic aggregation of polysiloxane ionomers having laterally bound, quaternary ammonium groups. These are compounds which are liquid at room temperature and are not crosslinked to form elastomers.

Proceeding from amino-functional siloxanes, it is possible to obtain zwitterionomers by reaction with propane sultone, as is described, for example, in D. Gravier et al., J. POLYM. SCI., POLYM. CHEM. ED., 17, 3559-3572 (1979). Depending on the concentration of the ionic groups, slight rubber-elastic properties are observed or flexible materials are obtained. The mechanical strengths are generally low and do not correspond to the state of the art of silicone elastomers customary today.

X. Yu et al., J. POLYM. SCI., PART B, POLYM. PHYSICS 24, 2681-2702 (1986) describe block copolymers of zwitterionomeric polysiloxanes and polyurethanes. The mechanical properties of the elastomers obtained are better the higher the proportion of polyurethane segments and the greater the ionic functionality present in the polysiloxane segment. However, pure polysiloxane zwitterionomers not also containing urethane copolymers display only low mechanical strengths.

SUMMARY OF THE INVENTION

It was an object of the invention to provide appropriately modified organopolysiloxanes which can be crosslinked to form high-strength silicone elastomers. It has surprisingly been found that ionically and/or organometallically functionalized organopolysiloxanes can be crosslinked to form silicone elastomers having an extremely high mechanical strength. Furthermore, high-strength silicone elastomers can also be obtained "in situ" by reaction of organopolysiloxanes with appropriately functionalized, ionically and/or organometallically functionalized additives. In addition to the crosslinking points of the appropriately modified organopolysiloxanes which arise from coulombic or coordinative interactions, it is possible, and preferred, for covalent crosslinking to occur.

DETAILED DESCRIPTION OF THE PREFERRED EMBODIMENTS

In the prior art, ionically and/or organometallically functionalized silicones are used only in a few cases for producing crosslinked products. There, if the production of elastomers is intended at all, only mechanical strength is observed. The silicone elastomers of the invention have a particularly high proportion of organopolysiloxane and in this way differ, in particular, from silicone block copolymers as are described, for example, in J.POLYM. SCI., PART B, POLYM PHYSICS 24, 2681-2702 (1986).

In contrast to organic elastomers such as the elastomers produced from natural rubber, the polydimethylsiloxanes which are preferably used have a low melting point (−45° C.) and an extremely low glass transition temperature (−125° C.), which is ultimately due to the high flexibility of the polydimethylsiloxane chain. The low melting point results in the silicone elastomer being unable to undergo strain-induced crystallization, which would considerably increase the mechanical strength of a silicone network, at room temperature despite sufficient symmetry of the polymer chains. In particular, the (intramolecular and intermolecular) interactions between polydimethylsiloxane chains are extraordinarily small because of the shielding effect of the methyl groups. This results, firstly, in the polymer chains being subjected to very different degrees of deformation and forces on mechanical stressing of a silicone network because the intermolecular interactions which bring about better stress delocalization are low. A second consequence is that in the case of bond rupture caused by mechanical overloading, virtually the entire deformation energy previously taken up by the polymer chain is suddenly released into the network environment, which leads to exponentially advancing further rupture and failure. The two chain fragments formed at the rupture of the bond therefore very quickly relax back into the undeformed equilibrium state without retaining a significant residual deformation energy due to chemical or physical interaction with the surrounding chains. These primarily unfilled silicone networks do not have a mechanism which could bring about at least partial self-healing of mechanically induced network defects. The mechanical strength of filler-free silicone elastomers is therefore extremely low and insufficient for most applications.

According to J. PHYS. CHEM. A 103, 11355-11365 (1999), mechanically induced chain rupture occurs homolytically, i.e. free-radical fragments are said to be formed. However, for the purposes of the present invention, it is assumed that the mechanical bond rupture of polydiorganosiloxanes tends instead to occur heterolytically. This means that instead of free radicals being formed, polymer fragments having an ionic end group are formed, which is of critical importance for a completely new idea of high-strength silicone elastomers. Thus, ionic functionalization of silicone elastomers opens up the possibility of improved stress equalization within the network and self-healing in the case of a mechanically induced rupture of the chain, which will be discussed in more detail below for a silicone network which is additionally covalently bonded.

The mechanical strength of the bonds formed by coulombic interactions is generally lower than the strength of covalent bonds such as the Si—O bond but far above the linkages formed by nonspecific interactions and hydrogen bonds, which can also be referred to collectively as van der Waals interactions. The use of polydiorganosiloxanes functionalized with ionic groups leads on covalent crosslinking to silicone networks in which the polymer chains are not only linked by the (conventional) covalent crosslinking points but also undergo additional intermolecular interactions by means of their ionic groups, which can also be viewed as ionic crosslinking points. When such a silicone network is deformed, as soon as the stresses occurring in the network exceed the mechanical strength of the ionic crosslinking points formed by coulombic forces the ionic crosslinking points are firstly broken without any bond ruptures occurring within the covalently linked silicone network. The charge separation necessary for breaking of the ionic crosslinking points leads to storage of deformation energy in the electric field. In addition, the oppositely charged groups formed on the polymer chains can recombine with corresponding groups of other polymer chains and thus reestablish the intermolecular ionic interactions between the polymer chains in the changed deformation state of the network corresponding to self-healing by reorganization of the network structure. Furthermore, the charged groups of the polymer chains can react chemically with adjacent silicone chains with retention of the charge. Finally, rupture of bonds also occur within the covalently linked silicone network on further deformation. In this case, the ionic crosslinking points and in particular the intact polymer chains containing charged groups formed when the ionic crosslinking points are broken function as anchor points for the relaxing ionic chain fragments of the ruptured siloxane chains, as a result of which these can release only part of the deformation energy stored in them and the silicone network as a whole experiences self-healing. The intermolecular interaction between polydimethylsiloxane chains brought about by the ionic groups and the establishment of the above-described self-healing mechanism obviously make possible the tremendous increase in the ultimate strength of the silicone elastomers of the invention.

As indicated above, additional covalent crosslinking of the silicone ionomers of the invention is preferred because, in particular, the creep (cold flow) which is known for ionomers and becomes particularly and disadvantageously apparent at elevated temperature is suppressed. For the abovementioned strengthening and self-healing mechanism to be brought to bear in the case of the additionally covalently crosslinked silicone ionomers, it is necessary for the interactions between the ionic or organometallic groups to be sufficiently strong but not to exceed the strength of the SiO bond, so that when the silicone network is deformed charge separation occurs only shortly before rupture of covalent bonds. Since the mechanical strength of an Si—O bond can be taken to be from about 2 to 4 nN, as described, for example, in CHEM. PHYS. LETT. 414 (2005) 132-137, preference is given to ionic and organometallic groups whose mechanical bond strength is at least 500 pN but not more than 4 nN, more preferably in the range from 1 to 2 nN. The mechanical strength of individual bonds can be determined experimentally by means of single-molecule AFM (Atomic Force Microscopy).

In contrast to van der Waals interactions, including, inter alia, hydrogen bonds, coulombic attraction forces are not only significantly stronger but also reach over distances which are orders of magnitude greater. For example, the theoretical coulombic bond energy of a positively charged silicon atom and a negatively charged oxygen atom at a distance of 1.64 Angstrom, which corresponds to the bond length of the bond between the silicon atom and the oxygen atom in polydimethylsiloxane, is −301 kJ/mol ("Si⁺—O⁻ ionic model). The energies due to coulombic forces of attraction therefore extend into the range of relatively low covalent bond energies. Thus, the bond energy of the silicon-carbon bond is, for comparison, −306 kJ/mol, which is virtually the same as the abovementioned value.

Apart from purely ionically crosslinked silicone polymers, silicone elastomers which contain not only ionic linkages but also crosslinking points formed by covalent bonds, in particular, have extremely high mechanical strengths. This is therefore not a contradiction to purely ionically crosslinked silicone polymers since the ionic fragments primarily formed in a siloxane network strand by heterolytic bond rupture can, after separation and with progressive deformation of the elastomer with action of external forces, form new ionic crosslinking points with ions of the respective opposite electric charge. The strengthening effect of ionic and/or organo-metallic bonds is thus also based on their reversibility. In contrast, a network based on pure polydiorganosiloxane is not capable of self-healing.

In a further embodiment of the invention, the ionic and/or organometallic functions are not introduced directly by means of the polydiorganosiloxane (A1) but are added as additive to the crosslinkable silicone rubber composition and bound to this in-situ via valences of the polydiorganosiloxane so as to form a polydiorganosiloxane (A1) of the general formula (I) as intermediate.

The present invention accordingly provides crosslinkable silicone rubber compositions comprising:

A1) 100 parts by weight of at least one polydiorganosiloxane of the general average formula (I)

$$R^1_a R^2_b R^3_c R^4_d SiO_{(4-a-b-c-2d)/2} \quad (I)$$

where
the radicals $R^1$ are, in each case independently of one another, monovalent, unsubstituted or halogen-substituted hydrocarbon radicals which have from 1 to 20 carbon atoms and are free of aliphatcally unsaturated groups and may contain heteratoms, the radicals $R^2$ are identical or different, monovalent, aliphatically unsaturated, unsubstituted or halogen-substituted hydrocarbon radicals which have from 1 to 20 carbon atoms, may contain heteroatoms and are capable of undergoing free-radical crosslinking or a hydrosilylation reaction,
the radicals $R^3$ are monovalent radicals containing ionic, organometallic or ionic and organometallic functions,
the radicals $R^4$ are divalent radicals of the general formula (II)

$$R^5 L^x M L_y R^5 \quad (II)$$

where
the radicals $R^5$ are divalent, unsubstituted or substituted hydrocarbon radicals which are free of aliphatic carbon-carbon multiple bonds and have from 2 to 20 carbon atoms and may have an oxygen atom on one or both valences,
the radicals L are functional groups which are bound covalently to $R^5$ and are bound ionically, organometallically or likewise covalently to M,
M is a metal atom, metal ion or an ionic group and
x is 0 or 1,
y is 0 or 1,
with the proviso that when x=0 or y=0, $R^5$ is bound directly to M,
a is from 1.6 to 2.0,
b is from 0 to 0.2,
c is zero or from 0.001 to 0.2 and
d is zero or from 0.001 to 0.2,
with the proviso that in the absence of constituent A2, at least one of the indices c and d is not zero and c+d≧0.001, A2) 0-60 parts by weight of at least one compound of the general formula (III) having ionic, organometallic or ionic and organometallic groups $$R^2 L_x M L_y R^2 \quad (III)$$

where $R^2$, L, x, y and M are as defined above,

B) 1-20 parts by weight of at least one crosslinker,
C) 0-200 parts by weight of reinforcing fillers or nonreinforcing fillers,
D) 0-100 parts by weight of catalyst and
E) 0-100 parts by weight of further constituents selected from the group consisting of color pigments, catalysts, inhibitors, plasticizers, solvents, stabilizers, flame-retardant additives, coupling agents, silicone resins, mold release agents, antistatics, hollow microspheres, blowing agents, antistick regulating additives, additives which increase the thermal or electrical conductivity and mixtures thereof.

The present invention further provides ionically, organometallically or ionically and organometallically functionalized polydiorganosiloxanes (A1) of the general formula (I) having a) an average degree of polymerization in the range from 20 to 10,000,
b) from 0 to 20 mol % of alkenyl-functional organosiloxy units,
c) from 0.1 to 20 mol % of monovalent ionically, organometallically or ionically and organo-metallically functionalized organosiloxy units and
d) from 0.1 to 20 mol % of divalent ionically, organometallically or ionically and organometallically functionalized organosiloxy units.

The polydiorganosiloxanes (A1) of the invention have the general average formula

$$R^1_a R^2_b R^3_c R^4_d SiO_{(4-a-b-c-2d)/2} \quad (I)$$

where a is from 1.6 to 2.0, b is from 0 to 0.2, c is zero or from 0.001 to 0.2, with the proviso that at least one of the indices c and d is not zero, i.e. $c+d \geq 0.001$.

Since the average degree of polymerization can be in the range from 20 to 10,000, the figures given for the indices in formula (I) imply that on average at least one radical $R^3$ or $R^4$ has to be present per molecule.

The radicals $R^1$, which can be identical or different, are monovalent, if appropriate halogen-substituted or heteroatom-containing hydrocarbon radicals which have from 1 to 20 carbon atoms and are free of aliphatically unsaturated groups. Examples are alkyl radicals such as the methyl, ethyl, propyl, isopropyl, tert-butyl, n-pentyl, isopentyl, neopentyl, tert-pentyl, n-octyl, 2-ethylhexyl, 2,2,4-trimethylpentyl, n-nonyl and octadecyl radicals; cycloalkyl radicals such as the cyclopentyl, cyclohexyl, cycloheptyl, norbornyl, adamantylethyl or bornyl radicals; aryl and alkaryl radicals such as the phenyl, ethylphenyl, tolyl, xylyl, mesityl or naphthyl radicals; aralkyl radicals such as the benzyl, 2-phenylpropyl and phenylethyl radicals and also, for example, halogenated derivatives and/or derivatives functionalized with organic groups of the above radicals, for example the 3,3,3-trifluoropropyl, 3-iodopropyl, 3-isocyanatopropyl, 3-aminopropyl, methacryloxymethyl and cyanoethyl radicals. $R^1$ can also be an OH group. Preferred radicals $R^1$ are the methyl, phenyl and 3,3,3-trifluoropropyl radicals. A particularly preferred radical $R^1$ is the methyl radical.

The radicals $R^2$, which can be identical or different, are monovalent, aliphatically unsaturated, if appropriate halogen-substituted or heteroatom-containing hydrocarbon radicals which have from 1 to 20 carbon atoms and are capable of undergoing free-radical crosslinking or a hydrosilylation reaction. Examples are alkenyl and/or alkynyl radicals such as the vinyl, allyl, isopropenyl, 3-butenyl, 2,4-pentadienyl, butadienyl, 5-hexenyl, 10-undecenyl, ethynyl, propinyl and hexinyl radicals; cycloalkynyl radicals such as the cyclopentenyl, cyclohexenyl, 3-cyclohexenylethyl, 5-bicycloheptenyl, norbornyl, 4-cyclooctenyl or cyclooctadienyl radicals; alkenylaryl radicals such as the styryl and styrylethyl radicals and also, for example, halogenated and/or heteroatom-containing derivatives of the above radicals, for example the 2-bromovinyl, 3-bromo-1-propinyl, 1-chloro-2-methallyl, 2-(chloro-methyl)allyl, styryloxy, allyloxypropyl, 1-methoxy-vinyl, cyclopentenyloxy, 3-cyclohexenyloxy, acryloyl, acryloyloxy, methacryloyl and methacryloyloxy radicals. Preferred radicals $R^2$ are the vinyl, allyl, 5-hexenyl and 10-undecenyl radicals. A particularly preferred radical is the vinyl radical.

The ionic and/or organometallic functions of the monovalent radicals $R^3$ are known in principle from coordination chemistry or organometallic chemistry. However, not all ionic and/or organometallic groups are suitable for producing high-strength silicone elastomers. For example, the crosslinking reaction can be adversely affected or prevented completely. In the interest of simplicity, references in the following to ionic functions also include, unless specifically indicated otherwise, organometallic functions, since the latter have coulombic effects.

Suitable monovalent radicals $R^3$ are, for example, alkylcarboxylic acid radicals such as the acrylic, methacrylic, n-propenoic, n-butanoic, n-pentanoic, n-undecanoic and n-octadecanoic acid radicals, aralkyl-carboxylic acid radicals such as the 4-hydroxycarbonyl-phenylmethyl and 4-hydroxycarbonylphenylether radicals, alkyldicarboxylic acid radicals such as the 2-propyl-malonic, 2-undecylmalonic and 2-propylsuccinic acid radicals, alkylsulfonic acid radicals such as the n-propylsulfonic and n-undecylsulfonic acid radicals, N-alkyliminodiacetic acid radicals such as the n-propyliminodiacetic and n-undecyliminodiacetic acid radicals (N-undec-11-yliminodiacetic acid radical), derivatives of β-ketocarbonyl compounds, for example the n-propyl and n-undecyl acetoacetate radicals(prop-3-yl acetoacetate and undec-11-yl acetoacetate radicals), 3-n-prop-3-ylacetylacetone and 3-n-undec-11-ylacetylacetone radical, quaternary ammonium compounds such as the N,N,N,N-trimethylprop-3-yl, N,N,N,N-tri-methylnon-9-yl, N,N,N,N-trimethylundec-11-yl and N,N,N,N-dimethylbenzylundec-11-yl radicals having counterions such as $F^-$, $Cl^-$, $Br^-$, $I^-$, ammonioalkylsulfonate zwitterions and betains (ammonioalkyl-carboxylates). Furthermore, metallocenes such as the ferrocene, ferrocenylethyl, ferrocenylundecyl and the analogous ferrocenium ion radicals are suitable radicals $R^3$ containing organometallic groups. Also suitable are terpyridine-functional radicals, in which case the terpyridine ligands in the radicals $R^3$ are preferably bound via $C_2$-$C_{20}$-alkyl groups to the silicon atom in the general average formula $R^1_a R^2_b R^3_c R^4_d SiO_{(4-a-b-c-2d)/2}$, for example in the case of the undec-11-yl-4'-oxy-2,2':6,2"-terpyridine radical. Catechol-functional radicals such as the 3,4-dihydroxy-phenylethyl or 3,4-dihydroxyphenylundec-11-yl radical are likewise suitable.

The divalent radicals $R^4$ contain ionic and/or organometallic functions which are in principle likewise known from coordination chemistry or organo-metallic chemistry. The divalent radicals $R^4$ are radicals of the general formula

$$R^5 L_x M L_y R^5 \quad (II)$$

where $R^5$ is a divalent, unsubstituted or substituted hydrocarbon radical which has from 2 to 20 carbon atoms and is free of aliphatic carbon-carbon multiple bonds and may have an oxygen atom on one or both valences, L is a functional group which is covalently bound to $R^5$ and ionically, organometallically or likewise covalently bound to M, M is a metal atom, metal ion or an ionic group and x is 0 or 1, y is 0 or 1, with the proviso that when x=0 or y=0, $R^5$ is bound directly to M.

Examples of divalent hydrocarbon radicals $R^5$ are alkylene radicals such as the ethylene radical —$(CH_2)_2$—, the propylene radical —$(CH_2)_3$—, the pentylene radical—$(CH_2)_5$— and the undecylene radical —$(CH_2)_{11}$—, aralkylene radicals such as the 4-ethylenephenyl —$(CH_2)_2$—$(C_6H_4)$— and the 1,4-bis(ethylene)benzene radical —$(CH_2)_2$—$(C_6H_4)$—$(CH_2)_2$—, alkylenoxy radicals such as the ethylenoxy radical —$(CH_2)_2$—O—, propylenoxy radical —$(CH_2)_3$—O— and undecyloxy radical —$(CH_2)_{11}$—O—, and dioxyalkylene radicals such as the ethylenedioxy radical —O—$(CH_2)_2$—O—.

Examples of functional groups L are ionic groups and complexing ligands such as carboxylate —COO$^-$, sulfonate —$SO_3^-$ or phosphonate groups —$P(O)OO^{2-}$, iminodiacetic acid anions —$N(CH_2)COO^-)_2$, β-ketocarbonyl groups such as acetylacetone (anion) bound in the 1 or 3 position to $R^5$, acetoacetic acid esterified by one of the free valences of $R^5$ or the corresponding, delocalized carbanion of the acetoacetic ester function. L can also be the cyclopentadienyl anion and, for example, a complexing ligand such as the 3,4-dihydroxyphenyl and a 2,2':6,2"-terpyridine radical bound in the 4' position to $R^5$. Suitable functions also include quaternary ammonium compounds and ammonioalkylsulfonate zwitterions and, for example, betaines (ammonioalkyl-carboxylates), in which case x=0 and the radicals $R^5$ are each bound directly via one valence to an alkyl- or aralkyl-substituted nitrogen atom in the formula (II) above.

Examples of metal atoms or metal ions M are ruthenium, iron, cobalt, and nickel atoms and polyvalent metal cations such as $Mg^{2+}$, $Ca^{2+}$, $Ba^{2+}$, $Fe^{2+}$ and $Fe^{3+}$, $Cu^{2+}$, $Zn^{2+}$, $Al^{3+}$, $Pb^{2+}$, $V^{3+}$, $Ti^{4+}$ or $Zr^{4+}$ or the uncharged atoms or ions of the lanthanides. However, the metal cations can also be singly positively charged metal cations such as $Li^+$ and $Na^+$. Furthermore, M can also be an alkyl- or aralkyl-substituted nitrogen atom, for example —$N^+(CH_3)_2$—. Since in this case x=0 in the formula (II), the divalent radicals $R^5$ are, as described in the previous paragraph, quaternary ammonium compounds and ammonioalkylsulfonate zwitterions and, for example, betaines formed by direct attachment of alkylene radicals.

Examples of combinations of metal atoms or metal ions and functional groups L as ligands are magnesium, calcium and zinc carboxylates, zinc sulfonates, zinc phosphonates, zirconium iminodiacetate, copper acetyl-acetonates, titanium and zirconium acetoacetates, iron(III)-catechol complex, iron (II)- or ruthenium(II)-2,2':6,2"-terpyridine complex, and metallocenes such as ferrocene.

To achieve the high mechanical strength of the silicone elastomers of the invention, a minimum function density of ionic or organometallic groups is necessary. On the other hand, the function density of the ionic and/or organometallic groups must not be too high, since the elastomeric properties are then lost and the material becomes brittle. The function density of ionic and/or organometallic groups bound to a polydiorganosiloxane is preferably in the range from 0.2 to 20 mol %, more preferably from 1 to 10 mol % and very most preferably from 2 to 7 mol %, relative to the diorganosiloxane units (D units) of the correspondingly functionalized polydiorganosiloxanes.

The ionic and/or organometallic functions can be present not only as ionic and/or organometallically functionalized organopolysiloxanes of the formula (I) which crosslink by reaction with suitable metal compounds such as salts, for example chlorides or sulfates, carboxylates such as acetates, alkoxides such as methoxide, ethoxide, n-propoxide, isopropoxide and n-butoxide, hydroxides and oxides to form ionic bonds but also in the form of additives which are vulcanized in a crosslinking reaction with a suitable organosiloxane. Both additives and polymers can have a linear (unbranched) structure or be branched.

Ionic and/or organometallic additives A2 have the general formula

$$R^2L_xM L_yR^2 \tag{III}$$

where $R^2$, L, x, y and M have one of the meanings given above, with the proviso that the preferred radicals $R^2$ in formula (III) are the vinyl, allyl, 5-hexenyl, 10-undecenyl radical and also the 10-undecenyloxy radical and the radicals L can be identical or different and are each a group which is covalently bound to $R^2$ and ionically and/or organometallically or likewise covalently bound to M and is selected from the group consisting of carboxylates, carbonates, sulfonates, phosphonates, glycinates, iminodiacetic acid anions, ethylenediaminetetraacetates, bis(salicylato)ethylenebis(imines), ethylenediamines, 1,3-propylenediamines, diethylenetriamines, triethylenetetramines, diphosphanes, diarsanes, triarsanes, dithiolenes and dimethylglyoximes. L can also be a cyclopentadienyl anion or a complexing ligand such as 3,4-dihydroxyphenyl or a terpyridine, for example a 2,2':6,2"-tepyridine radical bound in the 4' position to $R^2$, α,α'-bipyridine, 1-10-phenanthroline, porphin, phthalocyanine, crown ether or cryptate. Furthermore, L can also be a quaternary ammonium compound or ammonioalkylsulfonate zwitterion or betaine (ammonioalkylcarboxylate), in which case x and y=0 and the radicals $R^2$ are bound directly by their free valence to an alkyl- or aralkyl-substituted nitrogen atom in the above formula (III).

Examples of additives of the formula (III) are zinc undecylenate, zirconium bis(N-10-undecenylimino-diacetate), bis(4'-undecenyloxy-2,2':6,2"-terpyridine)-iron(II) or bis(4'-undecenyloxy-2,2':6,2"-terpyridine) ruthenium(II) and divinylferrocene.

If the crosslinking reaction occurs by a free-radical mechanism, the ionic and/or organometallic additive A2 of the formula (III) is reacted with a polydiorganosiloxane of the general average formula (IV)

$$R^1_e R^2_f SiO_{(4-e-f)/2} \tag{IV}$$

where
e is from 1.9 to 2.0 and
f is from 0 to 0.1
and $R^1$ and $R^2$ have the meanings given for formula (I).

As free-radical crosslinkers, it is in principle possible to use all peroxides which are useful in peroxidically crosslinkable silicone rubber compositions. Examples of suitable peroxides are dialkyl peroxides such as 2,5-dimethyl -2,5-di (tert-butylperoxy)hexane, di-tert-butyl peroxide, tert-butyl-tert-triptyl peroxide and tert-butyl triethylmethyl peroxide, diaralkyl peroxides such as dicumyl peroxide, alkyl aralkyl peroxides such as tert-butyl cumyl peroxide and α,α'-di(tert-butylperoxy)-m/p diisopropylbenzene, alkyl acyl peroxides such as t-butyl perbenzoate and diacyl peroxides such as dibenzoyl peroxide, bis(2-methyl-benzoyl)peroxide, bis(4-methylbenzoyl)peroxide and bis(2,4-dichlorobenzoyl)peroxide.

If the index f in the above formula (IV) is >0, the use of vinyl-specific peroxides, whose most important representatives are dialkyl and diaralkyl peroxides, is preferred. Particular preference is given to using 2,5-dimethyl-2,5-di(tert-butylperoxy)hexane and dicumyl peroxide. It is also possible to use mixtures of different peroxides. If the index f in the above formula is 0, the use of bis(2,4-dichlorobenzoyl)peroxide is particularly preferred.

The content of peroxide in the composition according to the invention comprising polydiorganosiloxane of the above formula (IV) and an ionic and/or organometallic additive is preferably in the range from 0.1 to 3.0% by weight, particularly preferably from 0.5 to 1.5% by weight.

Free-radical crosslinking by means of electron beams or high-energy electromagnetic radiation, for example γ-radiation, preferably $^{60}$Co radiation, is likewise possible.

If crosslinking of the additive is effected by hydrosilylation, the ionic and/or organometallic additive is reacted with an SiH-functional crosslinker in the presence of a catalyst which promotes the addition of SiH bonds onto the terminally unsaturated aliphatic groups of the additive, preferably alkenyl groups. The SiH-functional crosslinker has the average composition

$$H_g R^1{}_h SiO_{(4-g-h)/2} \quad (V)$$

where
H is a hydrogen atom,
$R^1$ is as defined above and
g, h are positive integers which meet the relationships $0.005 \leq g \leq 1$ and $0.005 \leq h \leq 2$, with the proviso that on average at least 3 silicon-bonded hydrogen atoms are present per crosslinker molecule.

The hydrogen content of the SiH-functional crosslinker, based exclusively on hydrogen atoms bound directly to silicon atoms, is preferably in the range from 0.002 to 1.7% by weight of hydrogen, more preferably from 0.02 to 0.8% by weight of hydrogen. The SiH functional crosslinker contains at least 3 and not more than 1000 silicon atoms per molecule, preferably from 4 to 700 and more preferably from 20 to 300 silicon atoms per molecule. The structure of the crosslinker can be linear, branched, cyclic or resin- or network-like. Preferred crosslinkers are poly(dimethylsiloxane-co-methylhydrogensiloxanes).

The crosslinker is preferably present in the crosslinkable mixture in such an amount that the molar ratio of SiH groups to the terminally unsaturated aliphatic groups, preferably alkenyl groups, of the ionic and/or organometallic additive is from 1 to 5, in particular from 1 to 3. The crosslinker can also be a mixture of different crosslinkers.

The addition reaction between the alkenyl groups of the additive and the SiH groups of the crosslinker, which is referred to as hydrosilylation, preferably occurs in the presence of a catalyst. It is in principle possible to use all hydrosilylation catalysts useful in addition-crosslinkable silicone rubber compositions. These are, in particular, metals such as platinum, rhodium, palladium, ruthenium and iridium and also organometallic compounds derived from these. Preference is given to platinum and platinum compounds and particular preference is given to complexes of platinum with vinylsiloxanes such as sym-divinyltetramethyl-disiloxane, also referred to as Karstedt catalyst.

The amount of hydrosilylation catalyst used depends essentially on the desired crosslinking rate and on economic aspects. The content of hydrosilylation catalyst in an addition-crosslinkable mixture of crosslinker and ionic and/or organometallic additive according to the invention is preferably from 0.05 to 1000 ppm by weight, based on the metal present therein, more preferably from 1 to 100 ppm by weight, based on the metal present therein.

Additional covalent crosslinking of ionically and/or organometallically functionalized polydiorganosiloxanes of the general formula (I) above can be carried out in a manner analogous to the crosslinking of the above-described additives, likewise free-radically or by means of a hydrosilylation reaction, with the conditions described there also apply in the same way here. Preference is given to the hydrosilylation reaction (addition crosslinking), with the proviso that the numerical value of the index b in the general formula (I) is >0.

The ionic and/or organometallic groups can be bound laterally and/or terminally to the polydiorgano-siloxane. In addition, the ionic and/or organometallic groups can be incorporated as divalent units in the main chain of the polydiorganosiloxane.

High-strength silicone elastomers can be formed by crosslinking of ionic and/or organometallic polymers and also by crosslinking of their blends with other polydiorganosiloxanes which have no ionic and/or organometallic functions.

The actual ionic and/or organometallic functions are preferably joined via spacers to the network strands in the silicone elastomer. These are formed, for example, from the radicals $R^5$ in the general formula (II) or from the radicals $R^2$ in the general formula (III) in one of the above-described crosslinking reactions.

The spacer can thus be a divalent hydrocarbon radical such as a substituted or unsubstituted $C_1$-$C_{100}$-, preferably $C_2$-$C_{20}$-alkylene chain which may also bear an oxygen atom on one or both terminal valences. As an alternative, it can also be a polydiorganosiloxane having 1-100, preferably 1-50, diorganosiloxane units or, for example, a polyalkylene oxide, for example a polyethylene oxide or polypropylene oxide having 1-100, preferably 1-20, ethylene oxide or propylene oxide units. As another alternative, the spacer can also be a polydiorganosiloxane having 1-100 diorganosiloxane units.

To form an ionic and/or organometallic bond between two network strands of the elastomer, the ionic and/or organometallic group preferably has 2 spacers so that it bonds to each of the two network strands via one of the two spacers. For example, an ionic and/or organo-metallic group can comprise a divalent metal ion or metal atom and two ligands having charges opposite to that of the transition metal ion. Each ligand is then bound via a spacer to another siloxane network strand. If the ionic and/or organometallic group has trivalent or higher-valent metal atoms or metal ions and, for example, 3 ligands, each ligand is bound via a spacer to at least 2 and not more than 3 different siloxane network strands. The ligands can be identical or different ligands. If an ionic and/or organometallic group comprises a metal atom or metal ion and more than 2 ligands, it is also possible for ligands which do not have a spacer and are not joined to the silicone network to also be bound to the metal atom or metal ion.

If the ionic functions are not electrically neutral, the radicals $R^3$ and $R^4$ in the general formula (I) and additives of the general formula (III) necessarily have an appropriate number of counterions to balance the charge. Depending on the charge on the ionic groups, the counterions can be cations such as $H^+$, $Li^+$, $Na^+$ or $Ca^{2+}$ or anions such as $F^-$, $Cl^-$, $Br^-$, $I^-$, $BF_4^-$ or $PF_6^-$.

In general, the ionic and/or organometallic groups will be coordinated. However, it is also possible for part of the ionic groups present in the elastomers of the invention or the ligands bound via spacers to the silicone network not to be coordinated, i.e. not to have a coordinate bond to a metal atom or to a monovalent or polyvalent metal ion. The number of such uncoordinated ionic and/or organometallic groups or free ligands can, for example, make up 10, 20, 30 or more than 50 mol % of the total ionic and/or organometallic groups present. However, preference is given to a high degree of coordination with less than 10 mol % of uncoordinated ionic and/or organometallic groups; particular preference is given to 100% coordination of the ionic and/or organometallic groups in the elastomers of the invention.

Conversely, it is possible for an excess of metal compounds, for example salts such as chlorides or sulfates, carboxylates such as acetates, alkoxides such as methoxide, ethoxide, n-propoxide, isopropoxide and n-butoxide, hydroxides and oxides to be present in the elastomers of the invention, i.e. these metal compounds are present in a greater amount than is necessary for complete formation of ionic bonds. This proportion can, for example, be 10, 20, 30 or more than 50 mol % of the amount of metal compounds necessary for 100% coordination of the ionic and/or organometallic groups. However, preference is given to a very low excess of metal compounds with less than 10 mol % of excess metal compounds, particularly preferably no excess of metal compounds, in the elastomers of the invention.

If appropriate, the inventive compositions which contain ionically and/or organometallically functionalized polydiorganosiloxanes or ionically and/or organometallically functionalized additives and can be crosslinked to form high-strength elastomers may contain fillers. These fillers are finely divided, if appropriate surface-treated inorganic solids having a specific surface area of at least 30 m²/g.

Possible fillers are all finely divided fillers which are customarily used in silicone compositions and have a specific surface area measured by the BET method of at least 30 m²/g, preferably from 100 to 800 m²/g, particularly preferably from 150 to 400 m²/g.

They are typically silicas, carbon blacks and finely divided oxides, hydroxides, carbonates, sulfates or nitrides of metals, for example silicon, aluminum, titanium, zirconium, cerium, zinc, magnesium, calcium, iron and boron.

The fillers preferably used in the inventive compositions which contain ionically and/or organometallically functionalized polydiorganosiloxanes or ionically and/or organometallically functionalized additives and can be crosslinked to form high-strength elastomers are pyrogenic silicas, precipitated silicas, silica hydrogels which have been dehydrated with retention of the structure, also known as aerogels, and also carbon blacks. Particular preference is given to precipitated and pyrogenic silicas.

Very particular preference is given to surface-treated fillers. The surface treatment can be achieved by methods which are well known to those skilled in the art for the hydrophobicization of finely divided solids. The hydrophobicization can be carried out either before incorporation into the inventive compositions which comprise ionically and/or organometallically functionalized polydiorganosiloxanes or ionically and/or organometallically functionalized additives and can be crosslinked to form high-strength elastomers or else in the presence of these compositions by the in-situ method. Both methods can be carried out both batchwise and continuously. Hydrophobicizing agents which are preferably used are organosilicon compounds which are capable of reacting with the filler surface to form covalent bonds or are lastingly physisorbed on the filler surface.

Preferred hydrophobicizing agents correspond to the general formulae (VIa) and (VIb)

  (VIa),

  (VIb), where
the radicals $R^6$ can be identical or different and are each a monovalent, unsubstituted or halogen-substituted hydrocarbon radical having from 1 to 18 carbon atoms, A is a halogen atom or —OH, —OR$^7$ or —OCOR$^7$ and B is —NR$^8{}_{3-y}$, $R^7$ is a monovalent hydrocarbon radical having from 1 to 18 carbon atoms, $R^8$ is a hydrogen atom or has the same meaning as, for example, $R^7$ and x is 1, 2 or 3 and, for example, y is 1 or 2, or the preferred hydrophobicizing agent is an organopolysiloxane comprising units of the formula $R^6{}_z SiO_{(4-z)/2}$, where $R^6$ is as defined above and z is 1, 2 or 3.

These preferably include alkylchlorosilanes such as methyltrichlorosilane, dimethyldichlorosilane, trimethylchlorosilane, octyltrichlorosilane, octadecyl-trichlorosilane, octylmethyldichlorosilane, octadecyl-methyldichlorosilane, octyldimethylchlorosilane, octa-decyldimethylchlorosilane and tert-butyldimethyl-chlorosilane; alkylalkoxysilanes such as dimethyl-dimethoxysilane, dimethyldiethoxysilane, trimethyl-methoxysilane or trimethylethoxysilane; trimethyl-silanol; cyclic diorgano(poly)siloxane such as octamethylcyclotetrasiloxane, decamethylcyclopenta-siloxane; linear diorganopolysiloxanes such as dimethylpolysiloxanes having trimethylsiloxy end groups and dimethylpolysiloxanes having silanol or alkoxy end groups; disilazanes such as hexaalkyldisilazanes, in particular hexamethyldisilazane, divinyltetramethyl-disilazane, bis(trifluoropropyl)tetramethyldisilazane; cyclic dimethylsilazanes such as hexamethylcyclo-trisilazane. It is also possible to use mixtures of the above-mentioned hydrophobicizing agents. To accelerate the hydrophobicization, it is also possible to add catalytically active additives such as amines, metal hydroxides, etc. The hydrophobicization can be carried out in one step using one or more hydrophobicizing agents, but can also be carried out in a plurality of steps using one or more hydrophobicizing agents.

Preferred fillers have, as the result of a surface treatment, a carbon content of at least 0.01% by weight up to a maximum of 20% by weight, preferably in the range from 0.1 to 10% by weight and most preferably in the range from 0.5 to 5% by weight.

If the inventive compositions which contain ionically and/or organometallically functionalized polydiorgano-siloxanes or ionically and/or organometallically functionalized additives and can be crosslinked to form high-strength elastomers are additionally covalently crosslinked, preference is given to the surface-treated silicas having a content of aliphatically unsaturated groups, for example from 0.01 to 2% by weight of Si-bonded vinyl groups.

The silicone elastomers produced according to the invention are suitable for many applications in which both the known advantageous properties of the silicones and their mechanical strength are important, preferably in the fields of automobile construction, electronics/electrical engineering, the aerospace industry, medical technology, production of domestic appliances, machine and instrument construction, paper coating and film coating.

EXAMPLES

Examples of the invention are given below for the purposes of illustration but without implying any restriction. In these examples, all parts or percentages are, unless indicated otherwise, by weight. Furthermore, all viscosities reported are based on a temperature of 25° C. The plasticity of the polymers was determined by means of a Brabender plastograph at 25° C. and 60 revolutions per minute.

Vi is the vinyl radical and Me is the methyl radical.

Example 1

Organopolysiloxane A is a high molecular weight polydiorganosiloxane of the formula $(Me_2ViSiO_{1/2})_2(Me_2SiO)_x(MeViSiO)_y$, where x>>y, so that on average every 2133rd silicon atom in the chain bears a vinyl group, corresponding to a vinyl content of 0.03% by weight of $CH=CH_2$. The Brabender value of 540-600 daNm indicates an average molar mass of about 450,000 g/mol.

8.7% by weight of zinc undecylenate, obtainable from Sigma-Aldrich Chemie GmbH, are firstly incorporated into organopolysiloxane A on a laboratory roll mill at a friction of 1:1.1 over a period of 20 minutes and 1.2% by weight of peroxide crosslinker A, based on the previously prepared mixture of organopolysiloxane A and zinc undecylenate, are then incorporated over a period of 10 minutes. Peroxide crosslinker A is a 45% strength paste of 2,5-bis(tert-butylperoxy)-2,5-dimethylhexane in silicone oil obtainable from Akzo under the trade name Trigonox 101-45 S.

The peroxidic mixture obtained in this way is subsequently introduced into a stainless steel pressing mold and vulcanized at 165° C. and a pressure of 5.45 MPa in a laboratory press for 15 minutes.

The ultimate tensile strength measured in accordance with DIN 53504-85/standard bar S1 was 2.7 times as high as the ultimate tensile strength of the vulcanizate of Comparative Example 1, likewise measured in accordance with DIN 53504-85/standard bar S1.

The elongation at break of the vulcanizate according to the invention from Example 1 was 2.5 times as high as that of the vulcanizate from Comparative Example 1.

Comparative Example 1

1.2% by weight of peroxide crosslinker A are incorporated into organopolysiloxane A on a laboratory roll mill at a friction of 1:1.1 over a period of 10 minutes.

The peroxidic mixture obtained in this way is subsequently introduced into a stainless steel pressing mold and vulcanized at 165° C. and a pressure of 5.45 MPa in a laboratory press for 15 minutes.

The ultimate tensile strength is measured in accordance with DIN 53504-85/standard bar S1.

Example 2

8.7% by weight of zinc sulfonate additive A are kneaded homogeneously into organopolysiloxane A at room temperature on a laboratory kneader (Polylab System, comprising a Rheocord 300p and a Rheomix 3000p from Gebrüder Haake GmbH) over a period of 30 minutes.

The zinc sulfonate additive A is prepared, for example, as in the steps a) to e) described below:

a) Preparation of N-allyl-4-phthalimidecarboxylic acid 102 ml (1.36 mol) of allylamine are added dropwise to a solution/suspension of 264.1 g (1.37 mol) of trimellitic anhydride in 670 ml of Veratrol at 70° C. at such a rate that the temperature firstly increases to 80° C. and then slowly to 100° C., resulting in the amide acid formed precipitating as a white solid. While continuing to stir, the mixture is slowly heated further until the water of reaction has been distilled off. Stirring is then continued for another 15 minutes under reflux, the mixture is allowed to cool and 500 ml of Veratrol are taken off at 130° C. under a partial vacuum. 850 ml of toluene are subsequently added, the mixture is refluxed briefly and then cooled to room temperature. The allyl imide which has precipitated is filtered off and recrystallized from toluene. Yield: 265.2 g (84%)

b) Preparation of N-allyl-4-phthalimidecarbonyl chloride 123.5 ml (1.46 mol) of oxalyl chloride are added dropwise to a suspension of 263.2 g (1.14 mol) of N-allyl-4-phthalimidecarboxylic acid (a) in 500 ml of toluene at 55° C. over a period of 112 hours. The mixture is subsequently heated on an oil bath at 100° C. The internal temperature rises from 80 to 85° C. Stirring is continued for 5 hours at 85° C., resulting in the suspension foaming and slowly becoming dark in color.

The solvent is then taken off at 50° C. under reduced pressure and the product obtained is finally dried in an oil pump vacuum for 30 minutes. Yield: 293.2 g (100%)

c) Preparation of citronellyl N-allyl-4-phthalimidecarboxylate 156.3 g (1.0 mol) of citronellol, 111.0 g (1.1 mol) of triethylamine and a catalytic amount (5.0 g) of 4-dimethylaminopyridine together with 1000 ml of toluene are placed in a reaction vessel. 250.0 g (1.0 mol) of N-allyl-4-phthalimidecarbonyl chloride (b) dissolved in 600 ml of toluene are added dropwise to this solution at room temperature over a period of 90 minutes while stirring, resulting in the internal temperature rising to 54° C. The mixture is then refluxed for another 3 hours.

After cooling, the mixture is poured onto 300 ml of ice/100 ml of concentrated HCl (pH 2). The two phases are separated and the organic phase is washed twice with 200 ml each time of water, dried over $Na_2SO_4$, filtered and largely evaporated at 50° C. in a partial vacuum on a rotary evaporator. The product is subsequently dried at 50° C. in an oil pump vacuum for another half an hour. This gives a reddish brown oil. Yield: 332.5 g (90%)

d) Selective sulfonation of citronellyl N-allyl-4-phthalimidecarboxylate by means of acetyl sulfate to form 3',7'-dimethyl-6'-sulfo-7'-octenyl N-allyl-4-phthalimidecarboxylate 133 ml of acetic anhydride are added to 700 ml of dry methylene chloride. The mixture is cooled to 0° C. in an ice bath. 48 ml of concentrated sulfuric acid are then added at such a rate that the temperature does not exceed 10° C. The solution is 1 molar in acetyl sulfate.

295 g (0.8 mol) of citronellyl N-allyl-4-phthalimide-carboxylate (c) are dissolved in 1000 ml of dry methylene chloride and the solution is cooled to 0° C. At this temperature, 881 ml of the previously prepared 1 molar acetyl sulfate solution are added dropwise and the mixture is stirred at 0° C. for another 112 hours.

For the work-up, the mixture is poured onto 2 l of ice. The phases are separated and the organic phase is washed with 5×250 ml of saturated sodium chloride solution, dried over $Na_2SO_4$, filtered and the solvent is taken off at 50° C. under reduced pressure. The residue is subsequently dried in an oil pump vacuum for another 4 hours. This gives a viscous, dark red substance. Yield: 318.8 g (89%)

e) Preparation of zinc bis(3',7'-dimethyl-6'-sulfonato-7'-octenyl N-allyl-4-phthalimidecarboxylate)=zinc sulfonate additive A 77.9 g (0.35 mol) of zinc acetate dihydrate dissolved in 500 ml of chloroform are added dropwise to 318.8 g (0.71 mol) of 3',7'-dimethyl-6'-sulfo-7'-octenyl N-allyl-4-phthalimidecarboxylate (d) dissolved in 500 ml of methylene chloride at room temperature while stirring. The mixture is subsequently refluxed for 1 hour and the solvents and, for example, the acetic acid formed are then taken off at an external temperature of 50° C. firstly under reduced pressure and then in an oil pump vacuum. Yield: 339.4 g (99%)

1.2% by weight of the peroxide crosslinker A described in Example 1 are incorporated into this inventive mixture of organopolysiloxane A and zinc sulfonate additive A on a laboratory roll mill at a friction of 1:1.1 over a period of 10 minutes.

The peroxidic mixture obtained in this way is subsequently introduced into a stainless steel pressing mold and vulcanized at 165° C. and a pressure of 5.45 MPa in a laboratory press for 15 minutes.

The ultimate tensile strength measured in accordance with DIN 53504-85/standard bar S1 was 5.8 times as high as the ultimate tensile strength of the vulcanizate from Comparative Example 1, likewise measured in accordance with DIN 53504-85/standard bar S1.

The elongation at break of the vulcanizate according to the invention from Example 1 was 12.1 times as high as that of the vulcanizate from Comparative Example 1.

Example 3

An addition-crosslinkable rubber A having the following composition is prepared:

96.4% of organopolysiloxane B, which is a polydiorganosiloxane of the formula $(Me_2ViSiO_{1/2})_2(Me_2SiO)_x$, having an average index x=620 and a viscosity of 20,000 MPas; 0.2% of organopolysiloxane C, which is a polydiorganosiloxane of the formula $(Me_2ViSiO_{1/2})_2$ $(Me_2SiO)_x(MeViSiO)_y$, where x>y, so that on average every 5th silicon atom in the chain bears a vinyl group, and has a viscosity of 1000 MPas; 2.5% of organopolysiloxane D, which is a polydiorganosiloxane of the formula $(Me_3ViSiO_{1/2})_2(Me_2SiO)_x(MeHSiO)_y$, where x>y, so that on average every 3rd silicon atom in the chain has an SiH bond, and has a viscosity of 1000 MPas; 0.23 g of an inhibitor which comprises 80% of the ethynylcyclo-hexanol and 20% of trimethylsilanol; 0.8% of trimethyl-silanol; and 0.1% of a solution of a platinum complex of sym-divinyltetramethyldisiloxane (Karstedt catalyst) in organopolysiloxane E, which is a polydiorganosiloxane of the formula $(Me_2ViSiO_{1/2})_2(Me_2SiO)_x$, having an average index x=220 and a viscosity of 1000 MPas so that the platinum content, based on the metal, is 1%.

This rubber A is mixed with 20.6% of zinc undecylenate and 20.6% of organopolysiloxane D, in each case based on 100% of rubber A, by means of a laboratory stirrer. The further addition of organopolysiloxane D is necessary to set a molar ratio of SiH groups to aliphatic double bonds of 2:1 in the mixture.

The addition-crosslinkable mixture obtained in this way is subsequently introduced into a stainless steel pressing mold and vulcanized at 170° C. and a pressure of 5.45 MPa in a laboratory press for 10 minutes. The ultimate tensile strength measured in accordance with DIN 53504-85/standard bar S1 was 5.2 times as high as the ultimate tensile strength of the vulcanizate from Comparative Example 2, likewise measured in accordance with DIN 53504-85/standard bar S1.

The elongation at break of the vulcanizate according to the invention from Example 3 was as high as that of the vulcanizate from Comparative Example 2.

Comparative Example 2

The addition-crosslinkable mixture of the rubber A described above in Example 3 is introduced into a stainless steel pressing mold and vulcanized at 170° C. and a pressure of 5.45 MPa in a laboratory press for 10 minutes.

The ultimate tensile strength is measured in accordance with DIN 53504-85/standard bar S1.

Example 4

The rubber A described in Example 3 is mixed with 11% of a poly(bis(acetoacetoxypropylpolydimethyl-co-poly-methylvinylsiloxane)titanium diisopropoxide) and 9.7% of organopolysiloxane D, in each case based on 100% of rubber A, by means of a laboratory stirrer. The further addition of organopolysiloxane D is necessary to set a molar ratio of SiH groups to silicon-bonded vinyl groups of 2:1 in the mixture.

The poly(bis(acetoacetoxypropylpolydimethyl-co-polymethylvinylsiloxane)titanium diisopropoxide) is prepared as in the steps a) to e) described below:

a) Preparation of 1,1-dimethyl-1-sila-2-oxacyclo-pentane

The preparation of 1,1-dimethyl-1-sila-2-oxacyclo-pentane is described in the patent DE 102 06 121 C1.

b) Preparation of sym-dihydroxypropyltetramethyl-disiloxane 111.3 g (0.96 mol) of 1,1-dimethyl-1-sila-2-oxacyclo-pentane (a) are placed in a reaction vessel while cooling in ice and stirring. 10.2 g (0.56 mol) of deionized water are slowly added dropwise over a period of 13 minutes, resulting in the temperature increasing to 23° C. The ice bath is subsequently removed and the mixture is stirred at 28° C. for another 2 hours. Yield: 120.7 g (99%)

c) Preparation of sym-bisacetoacetoxypropyltetra-methyldisiloxane 165.0 g (1.96 mol) of freshly distilled diketene are slowly added dropwise to 224.4 g (0.9 mol) of sym-dihydroxypropyltetramethyldisiloxane (b) and 6 drops of triethylamine at 85° C. over a period of 90 minutes at such a rate that the internal temperature is in the range from 85 to 95° C. The mixture is then stirred at 85° C. for another 90 minutes, 30 ml of methanol are added and the mixture is stirred at this temperature for a further 60 minutes. Excess methanol, methyl acetoacetate and other volatile constituents are taken off firstly under reduced pressure and finally for 1 hour at 120° C. in an oil pump vacuum. Yield: 357.8 g (95%)

d) Preparation of acetoacetoxypropylpolydimethyl-co-polymethylvinylsiloxane 0.4 ml of trifluoromethanesulfonic acid is added to a mixture of 45.3 g of bisacetoacetoxypropyltetramethyl-disiloxane (c) and 172 g of the organopolysiloxane C described in Example 3 under a nitrogen atmosphere while stirring. The mixture is then heated at 80° C. for 4 hours while stirring. The reaction mixture is allowed to cool to room temperature and admixed with 15 g of Tonsil Optimum FH filter aid (pH 10) and stirred for another 30 minutes. The solids are then filtered off and the filtrate is freed of volatile constituents in an oil pump vacuum. Yield: 159.1 g (73%). According to the $^1$H— and $^{29}$Si—NMR spectra, the polymer (d) has the average composition $(Me_2SiO)_{15.1}$ $(MeViSiO)_{4.2}(Me_2ViSiO_{1/2})_{0.2}$ (Me $(CH_2CH_2CH_2$—O— $(CO)CH_2$ $(CO)CH_3)$ $SiO_{1/2})_{1.7}$ $(Me_2 (OH)SiO_{1/2})_{0.1}$.

e) Preparation of poly(bis(acetoacetoxypropylpolydimethyl-co-polymethylvinylsiloxane)titanium diisopropoxide)

38 g (20 mmol) of acetoacetoxypropylpolydimethyl-co-polymethylvinylsiloxane (d) are added dropwise to 5.1 g (17.8 mmol) of titanium(IV) isopropoxide while stirring. The mixture is then heated to 75° C. and stirred at this temperature for another 2 hours. All volatile constituents are subsequently taken off at 75° C. in an oil pump vacuum. Yield: 37.7 g (92%) of a rubber-like high polymer.

The addition-crosslinkable mixture of rubber A, poly(bis) acetoacetoxypropylpolydimethyl-co-polymethyl-vinylsiloxane)titanium diisopropoxide) and organo-polysiloxane D obtained is subsequently introduced into a stainless steel pressing mold and vulcanized at 170° C. and a pressure of 5.45 MPa in a laboratory press for 10 minutes.

The ultimate tensile strength measured in accordance with DIN 53504-85/standard bar S1 was 1.7 times as high as the ultimate tensile strength of the vulcanizate of Comparative Example 2, likewise measured in accordance with DIN 53504-85/standard bar S1.

The elongation at break of the vulcanizate according to the invention from Example 4 was as high as that of the vulcanizate from Comparative Example 2.

The invention claimed is:

1. A crosslinkable silicone composition comprising
A1) 100 parts by weight of at least one polydiorganosiloxane of the average formula (I)

$$R^1_a R^2_b R^3_c R^4_d SiO_{(4-a-b-c-2d)/2} \quad (I)$$

where
the radicals $R^1$ are, independently of one another, monovalent, unsubstituted or halogen-substituted hydrocarbon radicals which have from 1 to 20 carbon atoms, are free of aliphatically unsaturated groups, and optionally contain heteroatoms,
the radicals $R^2$ are identical or different, monovalent, aliphatically unsaturated, unsubstituted or halogen-substituted hydrocarbon radicals which have from 2 to 20 carbon atoms, optionally contain heteroatoms, and are capable of undergoing free-radical crosslinking or a hydrosilylation reaction,
the radicals $R^3$ are monovalent radicals containing a β-ketocarbonyl group,
the radicals $R^4$ are divalent radicals of the formula (II)

$$R^5 L_x M L_y R^5 \quad (II)$$

where
the radicals $R^5$ are divalent, unsubstituted or substituted hydrocarbon radicals which are free of aliphatic carbon-carbon multiple bonds and have from 2 to 20 carbon atoms and optionally have an oxygen atom on one or both valences, the radicals L are functional groups selected from the group consisting of β-ketocarbonyl compounds, terpyridine compounds, catechol-functional compounds and cyclopentadienyls, which are bound covalently to $R^5$ and are bound ionically, organometallically or covalently to M,
M is a metal atom, metal ion or an ionic group and
x is 0 or 1,
y is 0 or 1,
with the proviso that when x=0 or y=0, $R^5$ is bound directly to M,
a is from 1.6 to 2.0,
b is $\geq$0 and up to 0.2,
c is zero or from 0.001 to 0.2 and
d is zero or from 0.001 to 0.2,
with the proviso that in the absence of constituent A2, at least one of the indices c and d is not zero and c+d$\geq$0.001,
A2) 0 -60 parts by weight of at least one compound of the general formula (III) having ionic, organometallic or ionic and organometallic groups $$R^2 L_x M L_y R^2 \quad (III)$$

where $R^2$, L, x, y and M are as defined above,
B) 1-20 parts by weight of at least one crosslinker,
C) optionally 0-200 parts by weight of reinforcing fillers or nonreinforcing fillers,
D) optionally 0-100 parts by weight of catalyst and
E) optionally 0-100 parts by weight of further constituents comprising color pigments, catalysts, inhibitors, plasticizers, solvents, stabilizers, flame-retardant additives, coupling agents, silicone resins, mold release agents, antistatics, hollow microspheres, blowing agents, antistick regulating additives, additives which increase the thermal or electrical conductivity, or mixtures thereof.

2. The crosslinkable silicone composition of claim 1, wherein the ionic or organometallic functions are added as an additive to a crosslinkable silicone rubber composition and bound in-situ via valences to a polydiorganosiloxane so as to form a polydiorganosiloxane A1 of the formula (I) as an intermediate.

3. The crosslinkable silicone composition of claim 1, wherein the additive A2 of the general formula (III) which has ionic, organometallic or ionic and organometallic groups is reacted with a polydiorganosiloxane of the average formula (IV)

$$R^1_e R^2_f SiO_{(4-3-f)/2} \quad (IV)$$

where
e is from 1.9 to 2.0 and
f is from 0 to 0.1.

4. A crosslinkable silicone composition comprising
A1) 100 parts by weight of at least one polydiorganosiloxane of the average formula (I)

$$R^1_a R^2_b R^3_c R^4_d SiO_{(4-a-b-c-2d)/2} \quad (I)$$

where
the radicals $R^1$ are, independently of one another, monovalent, unsubstituted or halogen-substituted hydrocarbon radicals which have from 2 to 20 carbon atoms, are free of aliphatically unsaturated groups, and optionally contain heteroatoms,
the radicals $R^2$ are identical or different, monovalent, aliphatically unsaturated, unsubstituted or halogen-substituted hydrocarbon radicals which have from 2 to carbon atoms, optionally contain heteroatoms, and are capable of undergoing free-radical crosslinking or a hydrosilylation reaction, the radicals $R^3$ are monovalent radicals containing ionic, organometallic or ionic and organometallic functions selected from the group consisting of β-ketocarbonyl compounds, terpyridine compounds, catechol-functional compounds and metallocenes, the radicals $R^4$ are divalent radicals of the formula (II)

$$R^5 L_x M L_y R^5 \quad (II)$$

where the radicals $R^5$ are divalent, unsubstituted or substituted hydrocarbon radicals which are free of aliphatic carbon-carbon multiple bonds and have from 2 to 20 carbon atoms and optionally have an oxygen atom on one or both valences, the radicals L are functional groups selected from the group consisting of β-ketocarbonyl compounds, terpyridine compounds, catechol-functional compounds and cyclopentadienyls, which are bound covalently to $R^5$ and are bound ionically, organometallically or covalently to M, M is a metal atom, metal ion or an ionic group and x is 0 or 1, Y is 0 or 1, with the proviso that when x=0 or y=0, $R^5$ is bound directly to M, a is from 1.6 to 2.0, b is >0 and up to 0.2, c is zero or from 0.001 to 0.2 and d is zero or from 0.001 to 0.2, with the proviso that in the absence of constituent A2, at least one of the indices c and d is not zero and c+d≧0.001, A2) 0-60 parts by weight of at least one compound of the general formula (III) having ionic, organometallic or ionic and organometallic groups $$R^2 L_x M L_y R^2 \quad (III)$$

where $R^2$, L, x, y and M are as defined above,

B) 1-20 parts by weight of at least one crosslinker,

C) optionally 0-200 parts by weight of reinforcing fillers or nonreinforcing fillers, D) optionally 0-100 parts by weight of catalyst and E) optionally 0-100 parts by weight of further constituents comprising color pigments, catalysts, inhibitors, plasticizers, solvents, stabilizers, flame-retardant additives, coupling agents, silicone resins, mold release agents, antistatics, hollow microspheres, blowing agents, antistick regulating additives, additives which increase the thermal or electrical conductivity, or mixtures thereof, wherein the crosslinker (B) is selected from the group consisting of compounds which effect free-radically initiated crosslinking (B1), compounds which effect addition crosslinking/hydrosilylation (B2), and compounds which effect crosslinking by formation of coulombic or dative interactions (B3) wherein the crosslinker (B1) is present in an amount of from 0.1 to 5 % by weight and is an organic peroxide or a mixture of organic peroxides, the crosslinker (B2) is present in an amount of from 1 to 20 % by weight and is an organosilicon compound having at least three Si-bonded hydrogen atoms and the crosslinker (B3) is present in an amount of from 0.1 to 20 % by weight and is a metal salt of an inorganic or organic acid.

5. The crosslinkable silicone composition of claim 1, wherein the crosslinked silicone compositions have a mechanical bond strength in the range from 500 pN to 4 nN after crosslinking.

6. A silicone elastomer obtained by crosslinking a silicone composition of claim 1.

7. A process for producing a silicone elastomer of claim 6, wherein the silicone composition is crosslinked at room temperature or above under atmospheric pressure or higher pressure.

* * * * *

UNITED STATES PATENT AND TRADEMARK OFFICE
CERTIFICATE OF CORRECTION

PATENT NO. : 7,759,434 B2  Page 1 of 1
APPLICATION NO. : 12/095236
DATED : July 20, 2010
INVENTOR(S) : Enno Funk et al.

It is certified that error appears in the above-identified patent and that said Letters Patent is hereby corrected as shown below:

Column 20, Line 62, Claim 4:

Delete "from 2 to 20 atoms"

and insert -- from 1 to 20 atoms --.

Signed and Sealed this

Fifth Day of October, 2010

David J. Kappos
*Director of the United States Patent and Trademark Office*